(12) United States Patent
Goto et al.

(10) Patent No.: US 9,859,694 B2
(45) Date of Patent: Jan. 2, 2018

(54) INSULATING FILM REMOVAL METHOD, INSULATING FILM REMOVAL APPARATUS, AND RECTANGULAR CONDUCTOR

(71) Applicant: TOYOTA JIDOSHA KABUSHIKI KAISHA, Toyota-shi (JP)

(72) Inventors: Kazuhiro Goto, Toyota (JP); Hajime Watanabe, Toyota (JP); Yasuyuki Matsushita, Miyoshi (JP); Yoshinori Matsuda, Toyota (JP)

(73) Assignee: TOYOTA JIDOSHA KABUSHIKI KAISHA, Toyota-shi (JP)

( * ) Notice: Subject to any disclaimer, the term of this patent is extended or adjusted under 35 U.S.C. 154(b) by 0 days.

(21) Appl. No.: 15/023,186

(22) PCT Filed: Aug. 6, 2014

(86) PCT No.: PCT/JP2014/004111
§ 371 (c)(1),
(2) Date: Mar. 18, 2016

(87) PCT Pub. No.: WO2015/040782
PCT Pub. Date: Mar. 26, 2015

(65) Prior Publication Data
US 2016/0233652 A1 Aug. 11, 2016

(30) Foreign Application Priority Data
Sep. 19, 2013 (JP) .................. 2013-194116

(51) Int. Cl.
*H02G 1/12* (2006.01)
*H02K 3/12* (2006.01)
(Continued)

(52) U.S. Cl.
CPC ......... *H02G 1/1202* (2013.01); *H01B 7/0009* (2013.01); *H02G 1/1258* (2013.01);
(Continued)

(58) Field of Classification Search
USPC ........................... 81/9.4, 9.51; 30/90.1–91.2
See application file for complete search history.

(56) References Cited

U.S. PATENT DOCUMENTS 9,318,235 B2 * 4/2016 Sato ..................... H02G 1/1268
2014/0225465 A1 8/2014 Goto

FOREIGN PATENT DOCUMENTS

JP 2011-182597 A 9/2011
JP 2012-210001 A 10/2012
(Continued)

OTHER PUBLICATIONS

International Search Report dated Nov. 4, 2014 for PCT/JP2014/004111 filed on Aug. 6, 2014.

*Primary Examiner* — Kenneth E Peterson
(74) *Attorney, Agent, or Firm* — Oblon, McClelland, Maier & Neustadt, L.L.P.

(57) ABSTRACT

An insulating film removal method according to the present disclosure includes first, second, and third removal steps. In the first removal step, an insulating film coated on a junction surface and an opposed surface opposed to the junction surface is removed, the junction surface being a surface where a rectangular conductor is joined with another rectangular conductor. In the second removal step, a corner of the rectangular conductor is removed so that a burr is formed on the junction surface and a side surface, the side surface adjoining the junction surface and the opposed surface. In the third removal step, the insulating film coated on the side surface is removed so that a burr is formed on the junction surface side.

2 Claims, 9 Drawing Sheets

(51) Int. Cl.
 H02K 15/00 (2006.01)
 H01B 7/00 (2006.01)
 H02K 3/04 (2006.01)
(52) U.S. Cl.
 CPC .............. H02G 1/1285 (2013.01); H02K 3/04 (2013.01); H02K 3/12 (2013.01); H02K 15/0081 (2013.01)

(56) References Cited

FOREIGN PATENT DOCUMENTS

JP   2013-165579 A   8/2013
WO   WO 2013/099001 A1   7/2013

\* cited by examiner

US 9,859,694 B2

INSULATING FILM REMOVAL METHOD, INSULATING FILM REMOVAL APPARATUS, AND RECTANGULAR CONDUCTOR

TECHNICAL FIELD

The present invention relates to an insulating film removal method, an insulating film removal apparatus, and a rectangular conductor. In particular, the present invention relates to an insulating film removal method for removing an insulating film from a rectangular conductor covered with the insulating film, an insulating film removal apparatus, and a rectangular conductor from which an insulating film is removed by the aforementioned method and/or apparatus.

BACKGROUND ART

Recently, in hybrid vehicles, electric vehicles, and so on, rotating electric machines have been increasingly used as driving apparatuses for vehicles in view of the environmental problem. It is required that the rotating electric machine mounted in a vehicle be a space-saving one, i.e., be small in size because the mounting space is limited. Further, it is required that the rotating electric machine have high power in order to improve the driving performance of the vehicle. In order to reduce the size of the rotating electric machine as well as to increase the power thereof, it is conceivable to increase the electric current flowing through the coil in the stator. To that end, it is necessary to secure the cross section of a coil used in the stator, and therefore it has been proposed to use a coil having a rectangular conductor.

This rectangular conductor includes an insulating film on its periphery. The rectangular conductor is disposed in slots, which are formed at regular intervals in the circumferential direction of the stator core, in a predetermined order so that a three-phase coil having U-, V-, and W-phases is formed. In order to electrically connect rectangular conductors forming these phases, it is necessary to remove the insulting film at the ends of the rectangular conductors and join the ends of the rectangular conductors to each other.

When the insulating film at the end of the rectangular conductor is removed, if the insulating film is cut from the four surfaces on the short sides and the long sides in the cross section of the joint lead wire, the peripheral surface itself of the rectangular conductor, which has been originally covered with the insulating film, is also cut and hence the rectangular conductor becomes thinner. Therefore, the size of the welding cross section is reduced. Consequently, there has been a problem that the end of the rectangular conductor is deformed after the welding of the end of the rectangular conductor and hence the welding quality deteriorates.

To solve this problem, Patent Literature 1 discloses a method in which after only the insulating film is cut from the short sides and the long sides of the joint lead wire, the insulating film remaining at the four corners of the rectangular conductor is cut (first method). Specifically, after the insulating film on the long sides at the end of the joint lead wire is cut, the insulating film on the short sides of the joint lead wire is cut. After that, the exposed four corners of the rectangular conductor are chamfered. In this way, it is possible to prevent the thickness of the rectangular conductor from being reduced.

However, in the above-described first method, since the four corners of the rectangular conductor are chamfered, burrs are formed at the four corners of the rectangular conductor. Therefore, there has still been a problem that the welding quality cannot be ensured.

Therefore, as a method for solving this problem, Patent Literature 1 discloses a method in which after the insulating film is cut from the peripheral surface of the rectangular conductor, the insulating film is cut from the side surfaces of the rectangular conductor toward the junction surface (second method). Note that the junction surface means, in a cross-section of a rectangular conductor, a surface that is joined with another rectangular conductor. Further, the side surfaces mean two surfaces adjoining the junction surface. In this way, when the junction surfaces of a pair of rectangular conductors are joined to each other, burrs protruding from the junction surfaces are sandwiched between the junction surfaces of the pair of rectangular conductors so that they do not protrude from the periphery of the pair of rectangular conductors. As a result, it is possible to improve the welding quality (joint quality) of the rectangular conductor.

CITATION LIST

Patent Literature

Patent Literature 1: Japanese Unexamined Patent Application Publication No. 2013-165579

SUMMARY OF INVENTION

Technical Problem

However, in the above-described second method, among the four corners, only two corners on the junction surface side are chamfered. Therefore, when the four corners are chamfered, there has still been a possibility that the above-described problem in the first method could occur. That is, when the four corners are chamfered, there has been a possibility that burrs could occur on sides other than the junction surface side. Therefore, there has been a possibility that a cause that could deteriorate the quality of the joint part of the rectangular conductor could occur.

For example, there is a possibility that a burr could protrude from the periphery of the pair of rectangular conductors, thus making contact between a weld electrode and the pair of the rectangular conductors unstable. Further, after the welding, an insulting coating is formed in the place at the end of the rectangular conductor where the original insulating film has been removed by applying powder coating or the like, and there is a possibility that the thickness of that insulating coating could be thinner in the place where a burr protrudes from the periphery of the pair of rectangular conductors.

An object of the present invention is to solve the above-described problem and provide an insulating film removal method capable of preventing the quality of the joint part of a rectangular conductor from deteriorating, an insulating film removal apparatus, and a rectangular conductor.

Solution to Problem

An insulating film removal method according to the present invention is a method for removing an insulating film from a rectangular conductor covered with the insulating film, including: a first removal step of removing the insulating film coated on a junction surface and an opposed surface opposed to the junction surface, the junction surface being a surface where the rectangular conductor is joined with another rectangular conductor; a second removal step of removing a corner of the rectangular conductor so that a burr is formed on the junction surface and a side surface, the side surface adjoining the junction surface and the opposed surface; and a third removal step of removing the insulating film coated on the side surface so that a burr is formed on the junction surface side.

Preferably, in the second removal step, two diagonal corners are first removed and then other two diagonal corners are removed.

Further, preferably, the method further includes a positioning step of conveying the rectangular conductor to places where the respective removal steps are performed and positioning the rectangular conductor in directions corresponding to the respective removal steps, and in each of the removal steps, the insulating film is removed by forcefully cutting the insulating film in one direction by using a pair of cutting means.

Further, an insulating film removal apparatus according to the present invention is an insulating film removal apparatus that removes an insulating film from a rectangular conductor covered with the insulating film, including: cutting means for removing the insulating film from the rectangular conductor; and positioning means for positioning the rectangular conductor in a predetermined position, in which the cutting means removes the insulating film coated on a junction surface and an opposed surface opposed to the junction surface, the junction surface being a surface where the rectangular conductor is joined with another rectangular conductor, the positioning means positions the rectangular conductor so that a corner of the rectangular conductor can be removed, the cutting means removes a corner of the rectangular conductor so that a burr is formed on the junction surface and a side surface, the side surface adjoining the junction surface and the opposed surface, the positioning means positions the rectangular conductor so that the insulating film coated on the side surface can be removed, and the cutting means removes the insulating film coated on the side surface so that a burr is formed on the junction surface side.

Further, a rectangular conductor according to the present invention is a rectangular conductor covered with an insulating film, in which a part of the insulating film coated on a junction surface, an opposed surface, a side surface, and a corner of the rectangular conductor is removed, the opposed surface being opposed to the junction surface, the side surface adjoining the junction surface and the opposed surface, the junction surface being a surface where the rectangular conductor is joined with another rectangular conductor, and a burr is formed on the junction surface side, the burr being formed when the insulating film is removed.

Advantageous Effects of Invention

According to the present invention, it is possible to provide an insulating film removal method capable of preventing the quality of the joint part of a rectangular conductor from deteriorating, an insulating film removal apparatus, and a rectangular conductor.

DESCRIPTION OF EMBODIMENTS

First Exemplary Embodiment

Exemplary embodiments according to the present invention are hereinafter explained with reference to the drawings. Note that the same symbols are assigned to the same components throughout the drawings and duplicated explanations are omitted as required.

Figure 1A:
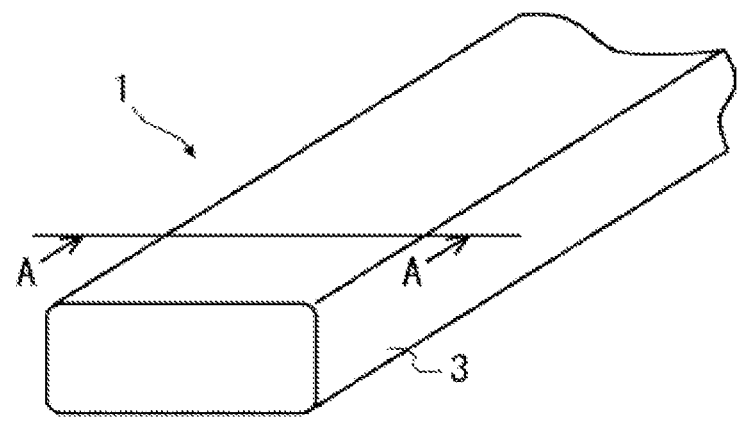
FIGS. 1A and 1B show a rectangular lead wire according to a first exemplary embodiment.
Figure 1B:
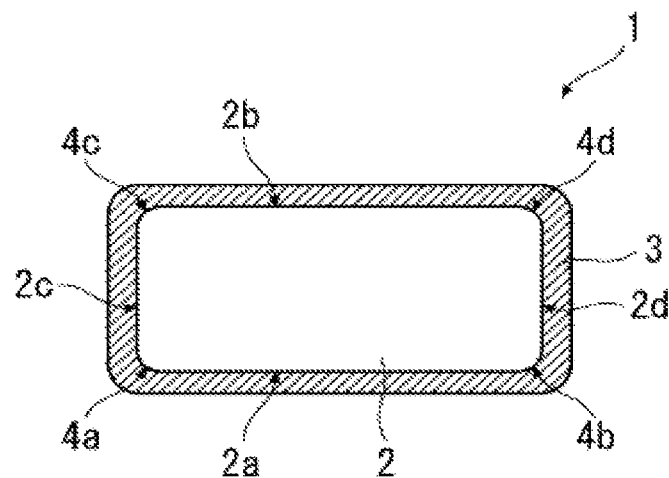

FIGS. 1A and 1B show a rectangular lead wire 1 according to a first exemplary embodiment. FIG. 1A is a perspective view showing the rectangular lead wire 1 and FIG. 1B is a cross section of the rectangular lead wire 1 taken along the line A-A.

As shown in FIGS. 1A and 1B, the rectangular lead wire 1 includes a rectangular conductor 2, which is a conductor. The rectangular conductor 2 is covered with an insulating film 3. The insulating film 3 is, for example, enamel or the like. However, the insulating film 3 is not limited to such material. The rectangular conductor 2 is formed so that its cross-sectional shape is roughly a rectangle.

As shown in FIG. 1B, the rectangular conductor 2 has a junction surface 2a, an opposed surface 2b, and side surfaces 2c and 2d. The junction surface 2a is a surface where the rectangular conductor 2 is joined with another rectangular conductor 2 when a coil is formed. The opposed surface 2b is a surface opposed to the junction surface 2a. The side surfaces 2c and 2d are surfaces adjoining the junction surface 2a and the opposed surface 2b. The side surfaces 2c and 2d are opposed to each other.

Further, as shown in FIG. 1B, the rectangular conductor 2 has corners 4a, 4b, 4c and 4d. The corner 4a is a corner between the junction surface 2a and the side surface 2c. The corner 4b is a corner between the junction surface 2a and the side surface 2d. The corner 4c is a corner between the opposed surface 2b and the side surface 2c. The corner 4d is a corner between the opposed surface 2b and the side surface 2d.

Figure 2:
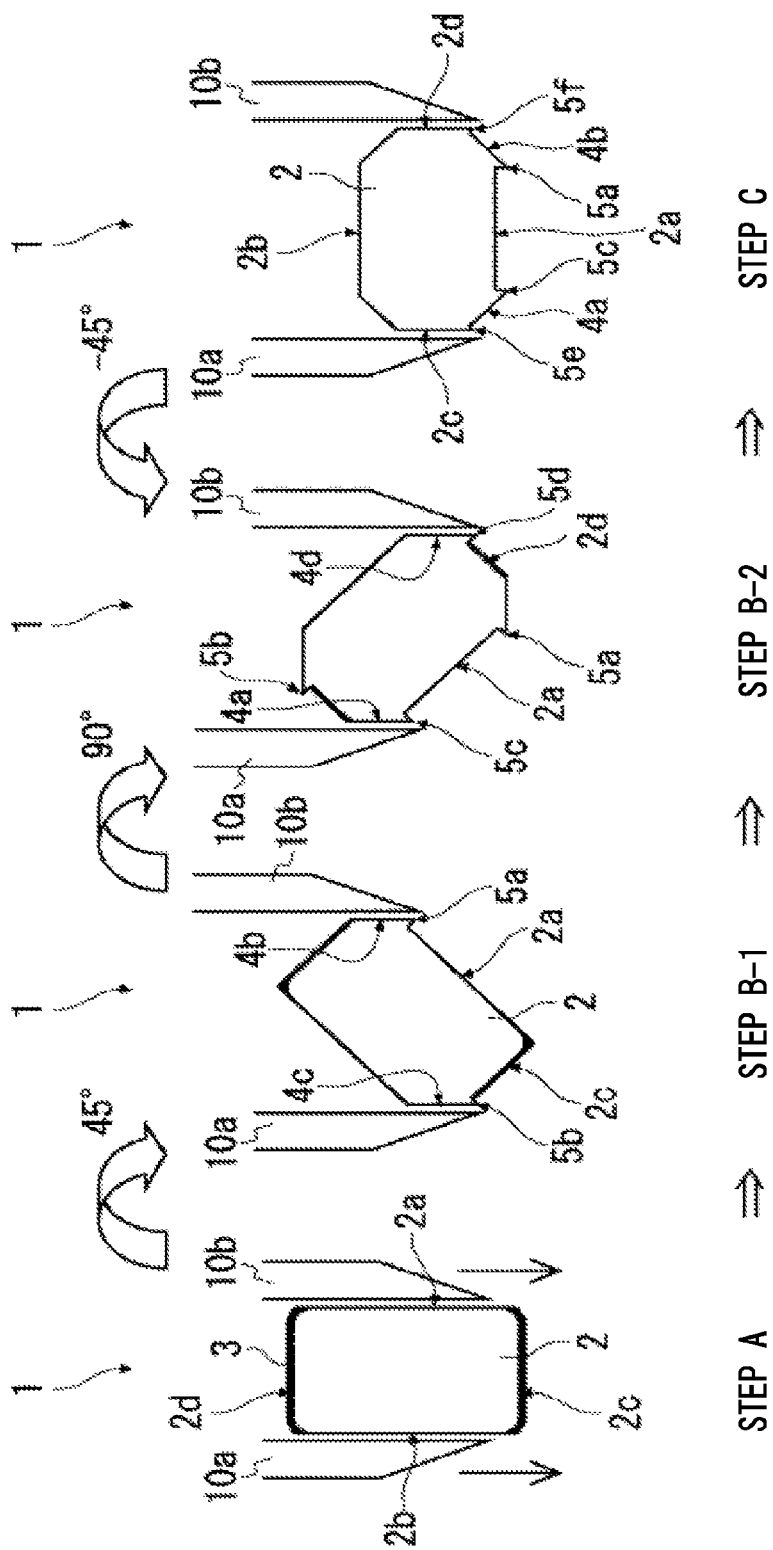
FIG. 2 shows a method for removing an insulating film coated on a rectangular conductor according to the first exemplary embodiment.

A method for removing the insulating film 3 coated on (i.e., applied onto) the rectangular conductor 2 is explained with reference to FIG. 2. FIG. 2 shows a method for removing the insulating film 3 coated on the rectangular conductor 2 according to the first exemplary embodiment.

The removal method according to this exemplary embodiment includes a step A (first removal step), a step B (second removal step), and a step C (third removal step). Further, the step B includes a step B-1 and a step B-2.

In the step A, insulating films 3 coated on the junction surface 2a and the opposed surface 2b of the rectangular conductor 2 are removed. The rectangular lead wire 1 is positioned so that: the junction surface 2a of the rectangular conductor 2 faces to the right; the opposed surface 2b faces to the left; the side surface 2c faces downward; and the side surface 2d faces upward. Then, a pair of cutters (cutting means) 10a and 10b cut (i.e., shave off) the junction surface 2a and the opposed surface 2b and thereby remove the insulating films 3 coated on the junction surface 2a and opposed surface 2b.

Note that the cutters 10a and 10b may be supported on, for example, one support member. Further, the cutters 10a and 10b may be supported so that they are roughly in parallel with each other. In this way, when the support member vertically moves, the cutters 10a and 10b vertically move in a synchronized manner. Further, by using the above-described mechanism, the cutters 10a and 10b can simultaneously remove the insulating films 3 coated on the junction surface 2a and the opposed surface 2b by forcefully cutting the insulating films 3 in one direction from the top of the insulating films 3 to the bottom thereof.

In the step B-1, the insulating films 3 coated on the corners 4b and 4c of the rectangular conductor 2 are removed. The rectangular lead wire 1 is positioned in a position that is rotated clockwise from the position in the step A by 45°. Then, the cutters 10a and 10b cut the corners 4b and 4c and thereby remove the insulating films 3 coated on the corners 4b and 4c. In this process, burrs 5a and 5b are formed at the corners 4b and 4c, respectively, due to the cutting process by the cutters 10a and 10b. The burr 5a is formed so as to protrude toward the junction surface 2a side. Meanwhile, the burr 5b is formed so as to protrude toward the side surface 2c side.

Note that in this process, the cutters 10a and 10b may simultaneously remove the insulating films 3 coated on the corners 4b and 4c by forcefully cutting the insulating films 3 in one direction from the top of the insulating films 3 to the bottom thereof as in the case of the step A or the like.

In the step B-2, the insulating films 3 coated on the corners 4a and 4d of the rectangular conductor 2 are removed. The rectangular lead wire 1 is positioned in a position that is rotated clockwise from the position in the step B-1 by 90°. Then, the cutters 10a and 10b cut the corners 4a and 4d and thereby remove the insulating films 3 coated on the corners 4a and 4d. In this process, burrs 5c and 5d are formed at the corners 4a and 4d, respectively, due to the cutting process by the cutters 10a and 10b. The burr 5c is formed so as to protrude toward the junction surface 2a side. Meanwhile, the burr 5d is formed so as to protrude toward the side surface 2d side.

Note that in this process, the cutters 10a and 10b may simultaneously remove the insulating films 3 coated on the corners 4a and 4d by forcefully cutting the insulating films 3 in one direction from the top of the insulating films 3 to the bottom thereof as in the case of the step A or the like.

In the step C, the insulating films 3 coated on the side surfaces 2c and 2d of the rectangular conductor 2 are removed. The rectangular lead wire 1 is positioned in a position that is rotated counterclockwise from the position in the step B-2 by 45°. Then, the cutters 10a and 10b cut the side surfaces 2c and 2d and thereby remove the insulating films 3 coated on the side surfaces 2c and 2d. In this process, the cutter 10a also removes the burr 5b, which is formed so as to protrude toward the side surface 2c side. Similarly, the cutter 10b also removes the burr 5d, which is formed so as to protrude toward the side surface 2d side. Further, in this process, burrs 5e and 5f are formed at the corners 4a and 4b, respectively, due to the cutting process by the cutters 10a and 10b. The burrs 5e and 5f are formed so as to protrude toward the junction surface 2a side.

Note that in this process, the cutters 10a and 10b may simultaneously remove the insulating films 3 coated on the corners 4a and 4d by forcefully cutting the insulating films 3 in one direction from the top of the insulating films 3 to the bottom thereof as in the case of the step A.

At the point when the step C is finished, the insulating films 3 coated on the periphery of the rectangular conductor 2 have been entirely removed. Further, at the point when the step C is finished, the burrs 5a, 5c, 5e and 5f have been formed in the rectangular conductor 2. These burrs 5a, 5c, 5e and 5f are all formed on the junction surface 2a side.

Note that the steps A, B-1, B-2 and C may be performed in the same place as each other, or may be performed in different places from each other.

A case where these steps are performed in the same place is explained. The rectangular lead wire 1 is set (i.e., disposed) in a rotating apparatus (positioning means) that rotates this rectangular lead wire 1. Then, after the cutters 10a and 10b remove the insulating films 3 coated on the junction surface 2a and the opposed surface 2b in the step A, the rotating apparatus rotates the rectangular lead wire 1 to the direction corresponding to the step B-1. Then, the interval between the cutters 10a and 10b used in the step A is adjusted so as to conform to the distance between the corners 4b and 4c. Then, as described above, the cutters 10a and 10b remove the insulating films 3 coated on the corners 4b and 4c. Similarly, in each of the steps B-2 and C, the rotating apparatus rotates the rectangular lead wire 1 to the direction corresponding to the respective step and the interval between the cutters 10a and 10b is adjusted, so that the insulating films 3 are removed.

Further, a case where the above-described steps are performed in different places is explained. In such a case, the cutters 10a and 10b are separately provided in the places where the respective steps are performed. Further, the rectangular lead wire 1 is conveyed from a place where the step A is performed to a place where the step B-1 is performed by a conveyer apparatus (positioning means). Similarly, the conveyer apparatus conveys the rectangular lead wire 1 from the place where the step B-1 is performed to a place where the step B-2 is performed and conveys it from the place where the step B-2 is performed to a place where the step C is performed. Further, the conveyer apparatus may rotate the rectangular lead wire 1 to the direction corresponding to the next step when the conveyer apparatus conveys the rectangular lead wire 1 to the place where the next step is performed. For example, when the conveyer apparatus conveys the rectangular lead wire 1 from the place where the step A is performed to the place where the step B-1 is performed, the conveyer apparatus may convey the rectangular lead wire 1 while rotating the rectangular lead wire 1 clockwise by 45°. In other words, in addition to each of the above-described removal steps, a step (positioning step) in which the conveyer apparatus conveys the rectangular lead wire 1 (rectangular conductor 2) from the place where the current removal step is performed to the place where the next removal step is performed and positions the rectangular lead wire 1 (rectangular conductor 2) to the direction corresponding to the next step may be included.

Figure 3:
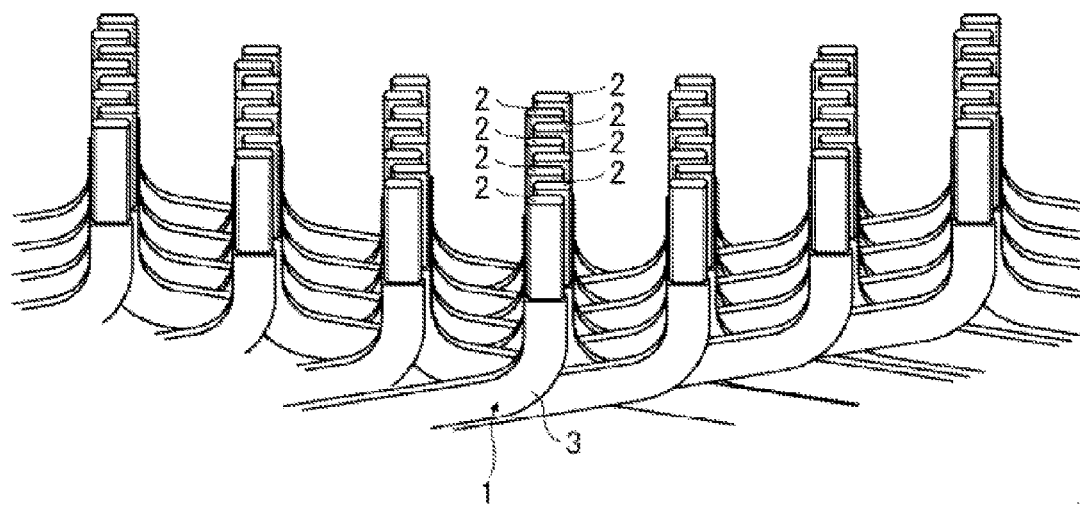
FIG. 3 is a perspective view showing a state where rectangular lead wires are arranged in a coil shape.

FIG. 3 is a perspective view showing a state where rectangular lead wires 1 are arranged in a coil shape. In FIG. 3, the insulating films 3 originally coated on the ends of the rectangular lead wires 1 have been already removed by the removal method explained above with reference to FIG. 2 and hence the ends of the rectangular conductors 2 are exposed. Further, the four corners at the end of each rectangular lead wire 1 are chamfered.

In the state shown in FIG. 3, two rectangular lead wires 1 (rectangular conductors 2) constitute one pair and they are welded together at their ends. The welding is performed by, for example, TIG welding.

Figure 4:
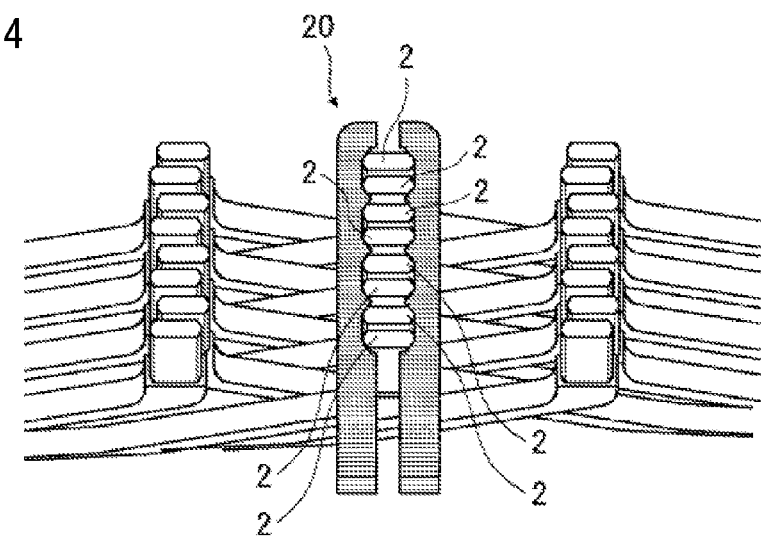
FIG. 4 is a perspective view showing a state where rectangular conductors, from which insulating films are removed, are clamped by a welding jig.

FIG. 4 is a perspective view showing a state where the rectangular conductors 2, from which the insulating films 3 are already removed, are clamped by a welding jig 20. As an example, the welding jig 20 clamps four pairs of rectangular conductors 2 (eight rectangular conductors 2) in FIG. 4. The welding jig 20 positions these rectangular conductors 2 when each two rectangular conductors 2 are welded together. Further, the welding jig 20 electrically connects the two rectangular conductors 2 to the ground when they are welded together.

Figure 5:
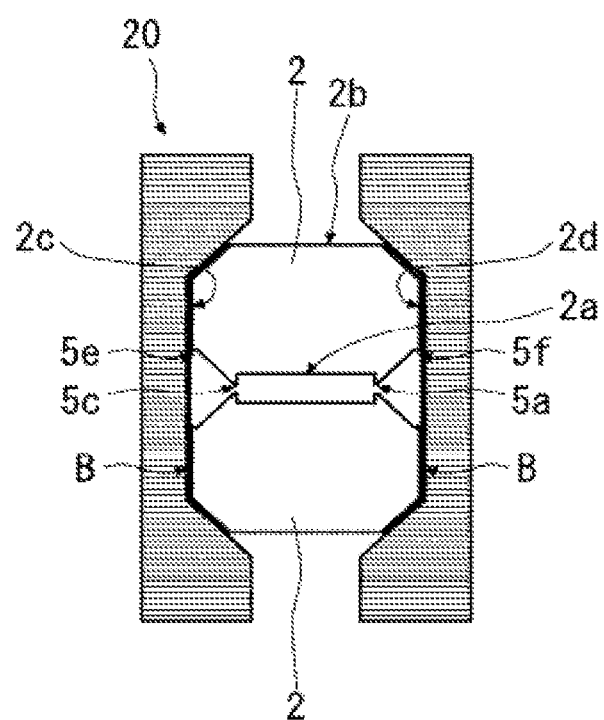
FIG. 5 is an enlarged view showing a state where a pair of rectangular conductors are clamped according to the first exemplary embodiment.

FIG. 5 is an enlarged view showing a state where a pair of rectangular conductors 2 are clamped according to the first exemplary embodiment. As shown in FIG. 5, contact surfaces B of the welding jig 20 come into contact with the opposed surfaces 2b and the side surfaces 2c and 2d of the rectangular conductors 2. Note that as described above, in this exemplary embodiment, the burrs 5a, 5c, 5e and 5f formed in the rectangular conductor 2 are all formed on the junction surface 2a side. That is, no burr is formed on the opposed surface 2b and the side surfaces 2c and 2d, which come into contact with the contact surfaces B of the welding jig 20. As a result, the contact surfaces are stabilized when the welding is performed, thus making it possible to prevent defective welding.

Figure 6A:
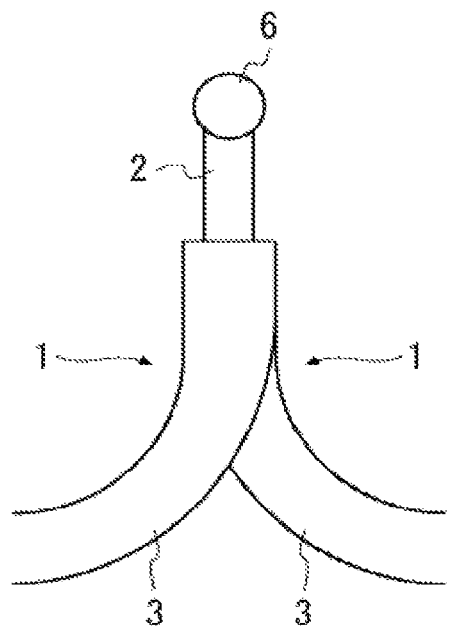
FIGS. 6A and 6B show a state where the tips of a pair of rectangular conductors are welded.
Figure 6B:
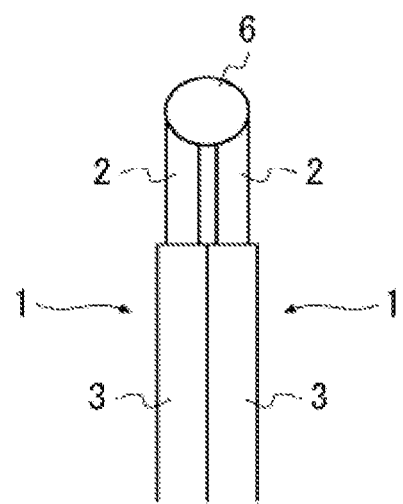

FIGS. 6A and 6B show a state where the tips of a pair of rectangular conductors 2 are welded together. FIG. 6A is a front view and FIG. 6B is a side view. As shown in FIGS. 6A and 6B, the tips of the rectangular conductors 2 are fused together by a welding process and a weld ball 6 is thereby formed at the tips of the pair of rectangular conductors 2. As a result, the pair of rectangular conductors 2 are electrically connected to each other.

After that, an insulating process is carried out for the exposed conductor part (the rectangular conductors 2 and the weld ball 6) by covering the exposed conductor part with a powder insulating coating.

Figure 7:
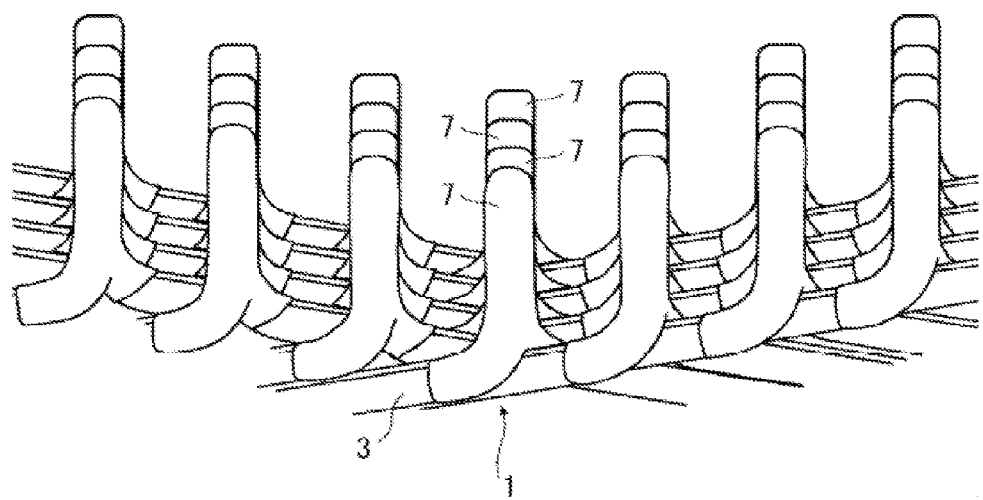
FIG. 7 is a perspective view showing a state where rectangular lead wires covered with a powder insulating coating are arranged in a coil shape.

FIG. 7 is a perspective view showing a state where rectangular lead wires 1 each of which is covered with a powder insulating coating are arranged in a coil shape. In each pair of rectangular conductors 2 that are welded together at their tips, the exposed conductor part (the rectangular conductors 2 and the weld ball 6) is covered with a powder insulating coating 7. As a result, the conductor parts of the rectangular lead wires 1 are insulated.

Figure 8A:
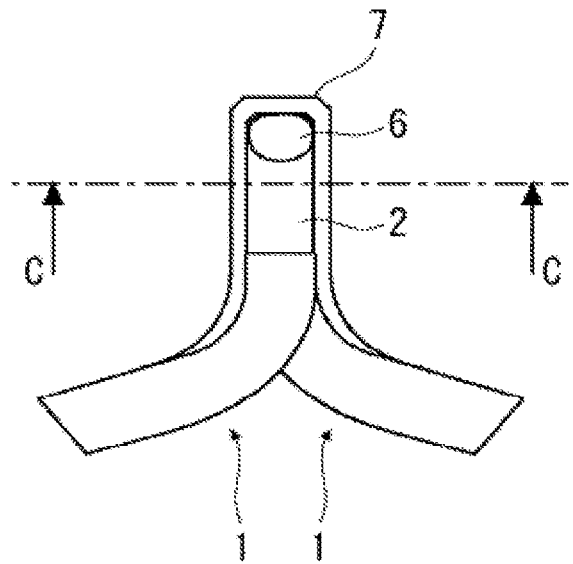
FIGS. 8A and 8B show details of a part covered with a powder insulating coating according to the first exemplary embodiment.
Figure 8B:
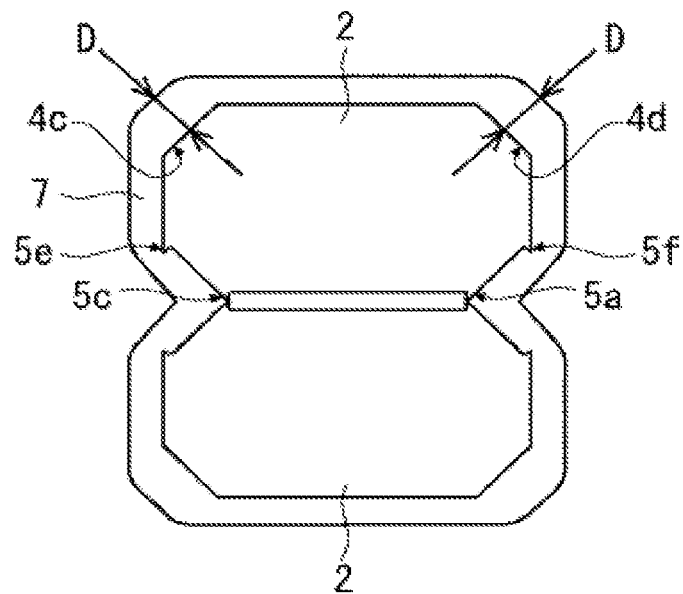

FIGS. 8A and 8B shows details of a part covered with a powder insulating coating according to the first exemplary embodiment. FIG. 8A is a side view and FIG. 8B is a cross section taken along the line C-C. Note that the C-C line cross section is located where the weld ball 6 is not formed in the rectangular conductor 2.

Note that for the insulation, it is necessary to ensure that the powder insulating coating has at least a necessary thickness D at the corners 4c and 4d on the outer peripheral surface side of the rectangular conductor 2. In this exemplary embodiment, as described above, the burrs 5a, 5c, 5e and 5f, which are formed when the insulating films 3 are removed, are formed on the junction surface 2a side and are not formed in the other surfaces. That is, the formed burrs do not affect the thickness D of the powder insulating coating at the corners 4c and 4d on the outer peripheral surface side of the rectangular conductor 2. Therefore, it is possible to prevent the thickness D of the powder insulating coating from being reduced at the corners 4c and 4d on the outer peripheral surface side of the rectangular conductor 2. That is, it is possible to adjust the thickness D to the necessary thickness or thicker.

Comparative Example

Figure 9:
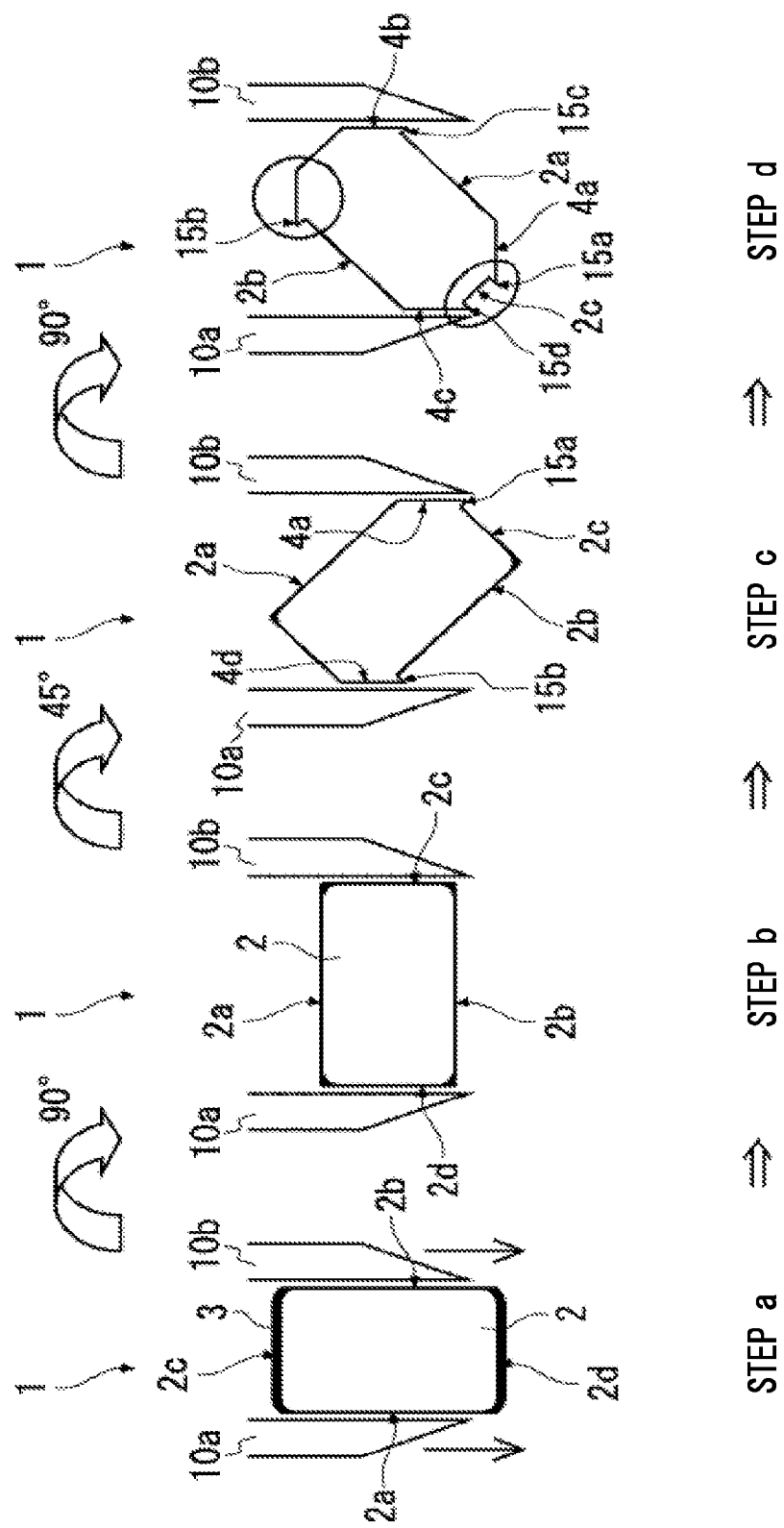
FIG. 9 shows a method for removing an insulating film coated on a rectangular conductor according to a comparative example.

Next, comparative examples of the first exemplary embodiment are explained. FIG. 9 shows a method for removing insulating films 3 according to a comparative example. The removal method according to the comparative example includes steps a to d.

In the step a, insulating films 3 coated on the junction surface 2a and the opposed surface 2b of a rectangular conductor 2 are removed. The rectangular lead wire 1 is positioned so that: the junction surface 2a of the rectangular conductor 2 faces to the left; the opposed surface 2b faces to the right; the side surface 2c faces upward; and the side surface 2d faces downward. Then, cutters 10a and 10b cut (i.e., shave off) the junction surface 2a and the opposed surface 2b and thereby remove the insulating films 3 coated on the junction surface 2a and opposed surface 2b.

In the step b, the insulating films 3 coated on the side surfaces 2c and 2d of the rectangular conductor 2 are removed. The rectangular lead wire 1 is positioned in a position that is rotated clockwise from the position in the step a by 90°. Then, the cutters 10a and 10b cut the side surfaces 2c and 2d and thereby remove the insulating films 3 coated on the side surfaces 2c and 2d.

In the step c, the insulating films 3 coated on the corners 4a and 4d of the rectangular conductor 2 are removed. The rectangular lead wire 1 is positioned in a position that is rotated clockwise from the position in the step b by 45°. Then, the cutters 10a and 10b cut the corners 4a and 4d and thereby remove the insulating films 3 coated on the corners 4a and 4d. In this process, burrs 15a and 15b are formed at the corners 4a and 4d, respectively, due to the cutting process by the cutters 10a and 10b. The burr 15a is formed so as to protrude toward the side surface 2c side. Meanwhile, the burr 15b is formed so as to protrude toward the opposed surface 2b side.

In the step d, the insulating films 3 coated on the corners 4b and 4c of the rectangular conductor 2 are removed. The rectangular lead wire 1 is positioned in a position that is rotated clockwise from the position in the step c by 90°. Then, the cutters 10a and 10b cut the corners 4b and 4c and thereby remove the insulating films 3 coated on the corners 4b and 4c. In this process, burrs 15c and 15d are formed at the corners 4b and 4c, respectively, due to the cutting process by the cutters 10a and 10b. The burr 15c is formed so as to protrude toward the junction surface 2a side. Meanwhile, the burr 15d is formed so as to protrude toward the side surface 2c side.

At the point when the step d is finished, the insulating films 3 coated on the periphery of the rectangular conductor 2 have been entirely removed. Further, at the point when the step d is finished, the burrs 15a, 15b, 15c and 15d have been formed in the rectangular conductor 2. It should be noted that although the burr 15c is formed on the junction surface 2a side, the burr 15b is formed on the opposed surface 2b side. Further, the burrs 15a and 15d are formed on the side surface 2c side. Therefore, there is a possibility that the below-explained problem could occur when rectangular conductors 2 are clamped and when an insulating process by a powder insulating coating is performed.

Figure 10:
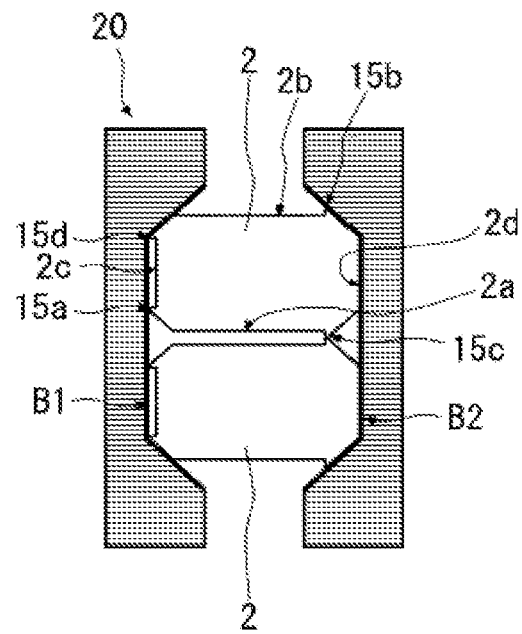
FIG. 10 is an enlarged view showing a state where a pair of rectangular conductors are clamped according to the comparative example.

FIG. 10 is an enlarged view showing a state where a pair of rectangular conductors 2 are clamped according to the comparative example. A contact surface B1 of the welding jig 20 comes into contact with the opposed surfaces 2b and the side surfaces 2c of the the rectangular conductors 2. Further, a contact surface B2 of the welding jig 20 comes into contact with the opposed surfaces 2b and the side surfaces 2d of the rectangular conductors 2. Note that as described above, the burrs 15a and 15d among the burrs 15a, 15b, 15c and 15d formed on the rectangular conductor 2 are formed on the side surface 2c side in the comparative example. Therefore, the burrs 15a and 15d come into contact with the contact surface B1 of the welding jig 20 in an uneven manner. Further, the burr 15b is formed on the opposed surface 2b side. Therefore, the burr 15b comes into contact with the contact surface B2 of the welding jig 20 in an uneven manner.

As a result, the contact between the contact surfaces of the welding jig 20 and the rectangular conductors 2 becomes unstable in the comparative example. Therefore, there is a possibility that defective welding could occur when a pair of rectangular conductors 2 are welded together.

In contrast to this, in the first exemplary embodiment, since none of the burrs formed on the rectangular conductor 2 protrudes on the contact surface side of the welding jig 20, the contact between the contact surfaces of the welding jig 20 and the rectangular conductors 2 is stable as described above. Therefore, in the first exemplary embodiment, it is possible to prevent the defective welding, which could occur in the comparative example when a pair of rectangular conductors 2 are welded together.

Figure 11:
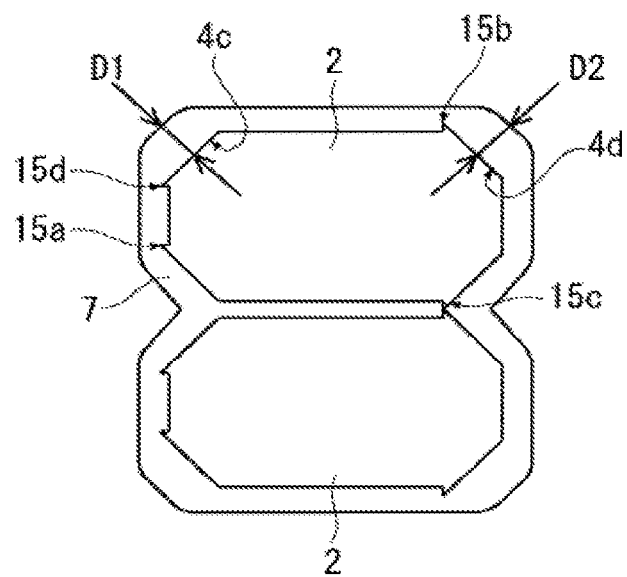
FIG. 11 is a cross section showing details of parts covered with a powder insulating coating according to the comparative example.

FIG. 11 is a cross section showing details of parts covered with a powder insulating coating according to the comparative example. Note that similar to FIG. 8B, the cross section shown in FIG. 11 shows a cross section at a part where the weld ball 6 is not formed in the rectangular conductor 2.

In the comparative example, the burrs 15a and 15d among the burrs 15a, 15b, 15c and 15d formed on the rectangular conductor 2 are formed on the side surface 2c side as described above. Therefore, because of the burrs 15a and 15d, the thickness D1 of the powder insulating coating at the corner 4c on the outer peripheral surface side of the rectangular conductor 2 is small. Further, the burr 15b is formed on the opposed surface 2b side. Therefore, because of the burr 15b, the thickness D2 of the powder insulating coating at the corner 4d on the outer peripheral surface side of the rectangular conductor 2 is small.

That is, in the comparative example, it could be impossible to ensure that the powder insulating coating has at least a thickness necessary for the insulation.

In contrast to this, in the first exemplary embodiment, the burrs formed in the rectangular conductor 2 are formed on the junction surface 2a side and are not formed in the other surfaces as described above. That is, the thickness of the powder insulating coating is not reduced due to the burrs formed in the rectangular conductor 2. Therefore, it is possible to ensure that the powder insulating coating has at least a thickness necessary for the insulation.

Modified Example

Note that the present invention is not limited to the above-described exemplary embodiments, and it can be modified as appropriate without departing from the sprit and scope of the present invention as explained below.

Although the insulating film removal method is applied to rectangular conductors 2 used for a coil in the above-described exemplary embodiments, the present invention is not limited to such application. The above-described insulating film removal method can be applied to rectangular conductors for any other purposes, provided that the rectangular conductor is covered with an insulating film.

Further, in the above-described exemplary embodiments, after a pair of rectangular conductors are welded together, an insulating process is performed by coating exposed conductor parts with a powder insulating coating. However, the present invention is not limited to such a procedure. The exposed conductor parts may be coated with an arbitrary insulating coating, provided that the exposed conductor parts can be insulated.

Further, in the above-described exemplary embodiments, the thickness of the powder insulating coating, which is coated on the exposed conductor parts after the welding of the pair of rectangular conductors, at the corners is ensued. However, the present invention is not limited to such a purpose. For example, the thickness on the side surface part of the rectangular conductor may be ensured, or/and the thickness on the opposed surface part of the rectangular conductor may be ensured.

This application is based upon and claims the benefit of priority from Japanese patent application No. 2013-194116, filed on Sep. 19, 2013, the disclosure of which is incorporated herein in its entirety by reference.

REFERENCE SIGNS LIST

1 RECTANGULAR LEAD WIRE
2 RECTANGULAR CONDUCTOR
2a JUNCTION SURFACE
2b OPPOSED SURFACE
2c, 2d SIDE SURFACE
3 INSULATING FILM
4a, 4b, 4c, 4d CORNER
5a, 5b, 5c, 5d, 5e, 5f BURR
10a, 10b CUTTER
20 WELDING JIG

The invention claimed is:
1. A method for removing an insulating film from a rectangular conductor covered with the insulating film, comprising:
removing the insulating film coated on a junction surface and an opposed surface opposed to the junction surface, the junction surface being a surface where, when tips of a pair of the rectangular conductors are welded together, the rectangular conductor should be joined with another rectangular conductor;
after the removing the insulating film coated on the junction surface and the opposed surface, removing four corners of the rectangular conductor so that burrs are formed on the junction surface, a burr is formed on a first side surface and a burr is formed on a second side surface, the first and second side surfaces adjoining the junction surface and the opposed surface; and
after the removing the four corners, removing the insulating film coated on the first and second side surfaces so that burrs are formed on the respective side surfaces so as to protrude toward the junction surface, wherein in the removing the four corners, two corners diagonally opposed to each other are first removed and then two other corners diagonally opposed to each other are removed.

2. The method for removing an insulating film according to claim 1, further comprising conveying the rectangular conductor to places where the removing the insulating film coated on the junction surface and the opposed surface, the removing the four corners, and the removing the insulating film coated on the first and second side surfaces are performed, and positioning the rectangular conductor in directions corresponding to the removing the insulating film coated on the junction surface and the opposed surface, the removing the four corners, and the removing the insulating film coated on the first and second side surfaces, respectively, wherein in each of the removing the insulating film coated on the junction surface and the opposed surface, the removing the four corners, and the removing the insulating film coated on the first and second side surfaces, the insulating film is removed by forcefully cutting the insulating film in one direction by using a pair of cutters.

* * * * *